United States Patent [19]

Åhslund et al.

[11] 4,435,483

[45] Mar. 6, 1984

[54] LOOSE SINTERING OF SPHERICAL FERRITIC-AUSTENITIC STAINLESS STEEL POWDER AND POROUS BODY

[75] Inventors: Christer Åhslund, Torshälla; Karl H. T. Andersson, Eskilstuna; Sven S. Bergh, Täby, all of Sweden

[73] Assignee: Nyby Uddeholm Powder Aktiebolag, Torshälla, Sweden

[21] Appl. No.: 346,869

[22] Filed: Feb. 8, 1982

[30] Foreign Application Priority Data

Feb. 6, 1981 [SE] Sweden ............................. 8100842

[51] Int. Cl.³ .......................... B22F 3/10; C22C 38/44
[52] U.S. Cl. ......................................... 428/566; 419/2; 419/23; 419/39; 419/45; 419/48; 75/246
[58] Field of Search ...................... 428/566; 419/2, 23, 419/48, 57, 39, 45; 75/246

[56] References Cited

U.S. PATENT DOCUMENTS

| | | | |
|---|---|---|---|
| 2,826,805 | 3/1958 | Probst et al. | 428/566 |
| 2,928,733 | 3/1960 | Wagner | 419/36 |
| 3,397,968 | 8/1968 | Lavendel et al. | 428/566 |
| 3,620,690 | 11/1971 | Bergstrom | 75/243 |
| 3,897,618 | 8/1975 | Church | 419/24 |
| 3,940,269 | 2/1976 | Bergstrom | 419/43 X |

FOREIGN PATENT DOCUMENTS 55-148701 11/1980 Japan ..................................... 419/2

OTHER PUBLICATIONS

Jones, W. D., *Fundamental Principles of Powder Metallurgy*, Edward Arnold Publishers Ltd., London, 1960, pp. 745-750.
Hirschhorn, J. S., *Introduction to Powder Metallurgy*, Amer. Powder Metallurgy Institute, N.Y., N.Y., 1969, pp. 202-203.
Lenel, F. V., *Powder Metallurgy Principles and Applications*, Metal Powder Industries Federation, Princeton, N.J., 1980, pp. 50-52.

*Primary Examiner*—Benjamin R. Padgett
*Assistant Examiner*—Matthew A. Thexton
*Attorney, Agent, or Firm*—Murray & Whisenhunt

[57] ABSTRACT

A porous sintered body, preferably a filter or filter material, with good corrosion resistance and with a pore volume which can be predicted within specified comparatively narrow limits, is made by loose sintering of a preferably gas-atomized spherical powder a ferritic-austenitic stainless steel.

10 Claims, 4 Drawing Figures

LOOSE SINTERING OF SPHERICAL FERRITIC-AUSTENITIC STAINLESS STEEL POWDER AND POROUS BODY

FIELD OF INVENTION

The invention relates to a porous sintered body with good corrosion resistance and with a pore volume which can be predicted within specified comparatively narrow limits. The invention relates especially to a filter or filter material with good corrosion resistance and given pore volume. The invention also relates to a method for producing a sintered body with the said properties.

BACKGROUND ART

Method is known of manufacturing filters and similar porous sintered bodies from stainless steel powder. The basis taken there was powder with irregular powder shape which gave the green body the requisite strength in that the individual powder granules engage with each other prior to final sintering. From the viewpoint of filtering for example, the irregular shape of the granules is however a disadvantage in that they render manufacture of a tailor-made material which is subject to requirements with regard to, for example, bore volume, back-pressure, etc., difficult or impossible.

If a well-defined geometric shape is imparted to the powder, in actual practice a spherical shape, and if the powder is screened to give a certain particle size distribution, it is possible to calculate in advance the pore volume and similar properties of the sintered body in those cases where the product is manufactured by loose sintering. Whilst conventionally-employed powders of ferritic or austenitic stainless steel with irregular powder shapes have given a good bond during cold pressing, spherical powders from the same steel have however proved to be extremely difficult to compress i.e. they exhibited extremely low green strength and hence could not be cold-pressed and sintered in the conventional manner.

DISCLOSURE OF THE INVENTION

The basis for the invention is the surprising discovery that spherical powder of ferritic-austentic stainless steels, i.e. stainless steel which has ferritic-austenitic structure at room temperature, can be employed during "loose" sintering, at least provided that spherically-shaped powder of high purity is employed, especially low degree of oxidisation, it is preferable to use powder which has been atomized in inert gas, i.e. disintegrated by a jet of inert gas and made to solidify to spherical powder during a free fall in inert gas atmosphere. Normally ferritic-austenitic steel has a composition of not more than 0.1%, preferably not more than 0.05% C, 8-26%, preferably 20-25% Cr, 2-8% preferably 3-6% Ni, not more than 6%, preferably 1-5% Mo with the residue usually only iron and impurities in the normal contents, together possibly with further alloying additives up to a total not exceeding 5%. Furthermore within the framework of the specified limits, the alloying elements are so adapted in relation to each other that at room temperature the steel has a ferritic-austentic structure. Before the powder is sintered, it is preferably fractionated so as to give the desire pore volume, thus the desired density of the filter. In this way, it is thus possible to obtain a predetermined pore volume within comparatively narrow limits.

Loose sintering is performed at a temperature between 1200° and 1600° C., approximately at a temperature between 1250° and 1400° C., and preferably at a temperature exceeding 1300° C. where the steel has ferritic structure. Sintering is carried out under vacuum, in inert gas atmosphere or under reducing atmosphere, whereby the submicroscopic thin outside layer which covers the surfaces of the spherical granules—the oxygen in inert gas atomized powder is normally between 50 and 200 ppm and in water atomized powder it does not exceed 1000 ppm—this appears as a result of a decarburising reaction. This serves to establish metallic contact and because of the higher diffusion rate of the ferrite, the contact points are rapidly consolidated to strong bridges with good mechanical strength. To obtain improved green strength in the part of the powdered body prior to sintering it is also possible to use a suitable binder which is removed before sintering, e.g. by heating up to a moderate temperature at which the binder evaporates (fumes off). Certain alcohols and other organic substances such as Bermocoll E 481 FQ (ethyl hydroxyethylcellulose, in the form of a whitish powder or granules, which is readily soluble in water to form colloidal solutions with excellent features as thickening agent, dispersing agent, stabilizing agent, protective colloid, water retention agent and binder (Berol Kemi AB, Sweden)) can be employed for this purpose. A suitable binder content is about 0.5%. The powder object in this way can be isostatically pressed whilst cold to a green body prior to sintering at high temperature in the ferritic state of the steel. Prior to sintering the green body is heating up at moderate temperature, i.e. above room temperature but below the ferrite formation temperature, so as to fume off the binder.

During sintering the powder is arranged "loosely" in a mould, i.e. without any compaction, and then with some degree of shaking or vibration. However during sintering the powder bed can be subjected to a certain pressure by mechanical loading so as to accelerate sintering. After sintering the product is cooled down to room temperature, thus restoring the ferritic-austenitic structure.

The composition of the ferritic steel is such that the steel exhibits extremely good resistance to pitting and general corrosion i.e. types of corrosion which are particularly accentuated in filters which are to be employed in highly corrosive environments, e.g. in the cellulose industry. The corrosion resistance can also be further improved by further heat treatment of the sintered product.

BRIEF DESCRIPTION OF DRAWINGS

In the following the invention will be further explained by reference to experiments which have been undertaken. Here reference will be made to the appended drawings where.

DESCRIPTION OF EXPERIMENTS PERFORMED

Example 1

Figure 1:
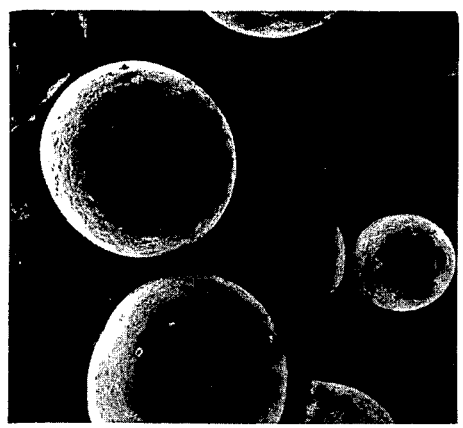
FIG. 1 shows on enlarged scale powder of the type which comprises the basic material for the product and for the procedure in accordance with the invention.

A stainless filter was to be manufactured. As a basic material a ferritic-austenitic steel alloy NU Stainless 744LN was employed having the chemical composition indicated in Table 1. The steel was in the form of a powder which had been produced by inert gas atomisation of a steel melt. The powder, shown in FIG. 1, had an oxygen content of about 100–120 ppm.

Figure 2:
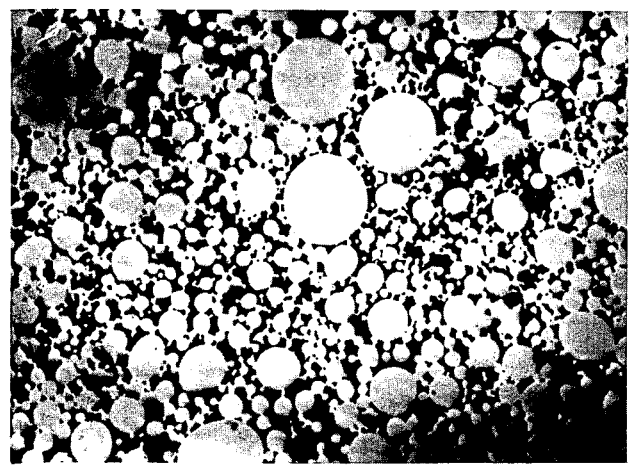
FIG. 2 shows, with somewhat reduced magnification a sintered product in accordance with the invention made in accordance with an initial embodiment of the procedure.

The powder was sintered in a deep-drawn carbon steel mould with low carbon content without added binder after cold isostatic pressing. Sintering was carried out at a temperature of 1300° C. for one hour in a reducing "inert gas atmosphere" consisting of 25% N2 and 75% H2. The porous sintered body thus produced is illustrated in FIG. 2.

Table 1 shows the chemical composition of the steel used in accordance with the invention, together with that of a conventional austenitic stainless steel.

TABLE 1

| Type of Steel | Grade | C | Cr | Ni | Mo | N |
|---|---|---|---|---|---|---|
| Ferritic-austenitic | NU Stainless 744 LN | 0.030 | 22 | 5.5 | 3.0 | 0.17 |
| Austenitic | TP 316 L | 0.030 | 17 | 11.5 | 2.2 | |

Table 2 shows the corrosion properties of the same steel:

| Quality | Pitting corrosion potential, mw i 3% NaCl at 60° C. | General corrosion, depth & extent. Natural still sea-water 11–18° C. Experimental period 98 days. Round surfaces | |
|---|---|---|---|
| | | Maximum depth etc | General extent of corrosion |
| NU Stainless 744 LN | 375 | 0 | 0 |
| TP 316 L | 155 | 0.30 | 45 |

Example 2

A sintered body was produced from ferritic-austenitic steel powder and under the same conditions as Example 1, except that as regards the procedure the bed of powder in the mould was loaded by a weight during sintering developing a moderate pressure of approximately 30 N/cm² (Newton per square cm). By this means the sintering period could be shortened to about 15 minutes.

Example 3

Figure 3:
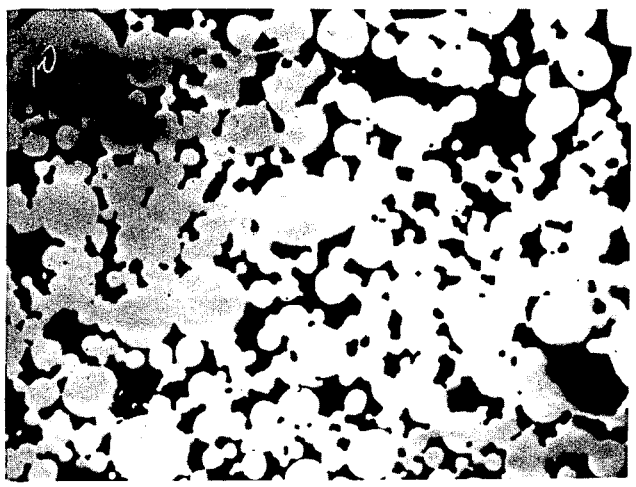
FIG. 3 shows, using the same magnification as in FIG. 2, a porous sintered body produced in accordance with an alternative embodiment in accordance with the invention.

A "forging preform" was to be produced. About 1% by weight of binder was mixed with the powder. The binder comprised alcohol, Bermocoll ®E481FQ. Cold pressing was undertaken by cold isostatic means. Prior to the subsequent sintering the green body was treated at a temperature above room temperature whereby the binder fumed off. Then high temperature sintering took place under the same pressure as in Example 2 at 1325° C./hour in an atmosphere consisting of 25% N2 and 75% H2. As in the preceding example a porous sintered body was obtained with a good bond between the sintered granules, as shown in FIG. 3. The powder was of the same type as in Example 1 and 2.

Example 4

Figure 4:
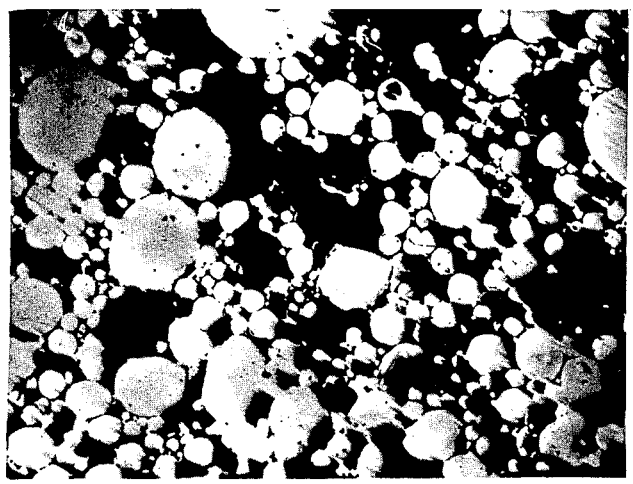
FIG. 4 illustrates a "sintered product" from austenitic steel powder.

To test the austenitic steel TP 316 L first of all a green body was produced from a powder of the said austenitic steel. The powder had been manufactured in the same way as the powder in accordance with examples 1–3. The green body was cold isostatically pressed after which the binder was removed. Sintering took place at 1300° C./1 hour in hydrogen gas atmosphere and under a moderate pressure as in Example 2 and 3. The sintering between the grains was very imperfect and a stable body was not obtained. FIG. 4 illustrates the appearance of the product.

We claim:

1. A porous sintered body, with good resistance to corrosion and with a pore volume which can be predetermined within given narrow limits, produced by loose sintering of a spherical powder of stainless steel at a sintering temperature between 1200° C. and 1600° C., wherein said stainless steel has a ferritic-austenitic structure at room temperature and a ferritic structure at the sintering temperature.

2. The sintered body as claimed in claim 1, wherein said sintered body is a filter material.

3. The sintered body as claimed in claim 1, wherein said sintered body is a filter.

4. The sintered body as claimed in claim 1, wherein the ferritic-austenitic steel has the composition C:0.1% maximum, Cr: 18–26%, Ni: 2–8%, Mo: 6% maximum, other alloying substances totalling not more than 5%, the balance being iron and impurities in normal amounts.

5. The sintered body as claimed in claim 4, wherein the steel has the composition C: 0.05% maximum, Cr: 20–25%, Ni: 3–6%, Mo: 1–5%, and the balance being iron and impurities in normal amounts.

6. The sintered body as claimed in claim 5, wherein the powder has an oxygen content not exceeding 1,000 ppm.

7. The sintered body as claimed in claim 6, wherein the powder has an oxygen content not exceeding 200 ppm.

8. A method for producing a porous sintered body, with good corrosion resistance and with a given pore volume which can be predetermined within narrow limits, comprising loose sintering of a gas-atomized spherical powder of a stainless steel which has ferritic-austenitic structure at room temperature, said loose sintering being conducted in the ferritic state of the steel at a temperature between 1200° C. and 1600° C.

9. The method according to claim 8, wherein the sintering is performed at a temperature between 1250° C. and 1400° C.

10. The method as claimed in claim 9, wherein the powder is subjected to a pressure loading during sintering of between 10 and 1000 Newton/cm².

* * * * *